US012654247B2

(12) United States Patent
McIver et al.

(10) Patent No.: US 12,654,247 B2
(45) Date of Patent: Jun. 16, 2026

(54) SYSTEMS AND METHODS FOR JOINING METAL MATRIX COMPOSITE MATERIALS

(71) Applicant: THE BOEING COMPANY, Arlington, VA (US)

(72) Inventors: Carl Roy McIver, Everett, WA (US); John Ralph Hull, Kinnelon, NJ (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/752,868

(22) Filed: Jun. 25, 2024

(65) Prior Publication Data

US 2025/0387845 A1 Dec. 25, 2025

(51) Int. Cl.
| | |
|---|---|
| *B23K 1/00* | (2006.01) |
| *B23K 1/19* | (2006.01) |
| *B23K 1/20* | (2006.01) |
| *B23K 20/00* | (2006.01) |
| *B23K 35/28* | (2006.01) |
| *B23K 20/02* | (2006.01) |
| *B23K 103/10* | (2006.01) |
| *B23K 103/16* | (2006.01) |

(52) U.S. Cl.
CPC ................ *B23K 1/19* (2013.01); *B23K 1/206* (2013.01); *B23K 35/286* (2013.01); *B23K 20/02* (2013.01); *B23K 2103/10* (2018.08); *B23K 2103/16* (2018.08)

(58) Field of Classification Search
CPC ................ B23K 1/19; B23K 1/00–206; B23K 2103/10; B23K 2103/16–172; B23K 2103/52; B23K 35/286–288; B23K 20/00–04

USPC ................ 228/121, 262.5–262.51, 245–255, 228/193–195
See application file for complete search history.

(56) References Cited

U.S. PATENT DOCUMENTS

| | | | | |
|---|---|---|---|---|
| 3,795,042 A | * | 3/1974 | Kreider | .................. C22C 47/20 29/419.1 |
| 4,260,441 A | * | 4/1981 | Prewo | .................. C22C 47/066 428/164 |
| 4,469,757 A | * | 9/1984 | Ghosh | ..................... C22C 47/20 428/614 |

(Continued)

FOREIGN PATENT DOCUMENTS

| | | | | |
|---|---|---|---|---|
| CA | 2646752 A1 | * | 7/2009 | ........... E21B 10/573 |
| CN | 1687481 | | 10/2005 | |

(Continued)

OTHER PUBLICATIONS

Yarahmadi et al. "Transient liquid phase diffusion bonding of Al/Al2O3 nanostructured metal matrix composites" (2014).*

(Continued)

*Primary Examiner* — Kiley S Stoner

(74) *Attorney, Agent, or Firm* — Joseph M. Butscher; Carroll, Hoette & Butscher, LLC

(57) ABSTRACT

A method includes disposing a joining alloy between a first metal matrix composite substrate and a second metal matrix composite substrate to provide an assembly, and heating the assembly to a melting temperature of the joining alloy for a predetermined period of time. The melting temperature of the joining alloy is less than a melting temperature of the first metal matrix composite substrate and the second metal matrix composite substrate.

21 Claims, 3 Drawing Sheets

(56)                References Cited

U.S. PATENT DOCUMENTS

| | | | | | | |
|---|---|---|---|---|---|---|
| 4,488,673 | A | * | 12/1984 | Hopper, Jr. | .......... | B23K 35/001 |
| | | | | | | 228/122.1 |
| 4,811,890 | A | * | 3/1989 | Dowling | .............. | B23K 20/233 |
| | | | | | | 228/157 |
| 4,978,054 | A | * | 12/1990 | Ferrando | ................ | B23K 20/16 |
| | | | | | | 228/265 |
| 4,982,893 | A | * | 1/1991 | Ruckle | ................... | B23K 20/22 |
| | | | | | | 228/262.71 |
| 5,100,049 | A | * | 3/1992 | Divecha | ................ | B23K 35/34 |
| | | | | | | 228/198 |
| 5,141,145 | A | * | 8/1992 | Das | ......................... | C23C 4/131 |
| | | | | | | 228/235.1 |
| 5,874,175 | A | * | 2/1999 | Li | ............................ | B23K 1/19 |
| | | | | | | 428/408 |
| 6,129,261 | A | * | 10/2000 | Sanders | ................ | B23K 20/02 |
| | | | | | | 228/157 |
| 6,257,481 | B1 | * | 7/2001 | Shirzadi-Ghoshouni | .................... | |
| | | | | | | B23K 20/16 |
| | | | | | | 228/195 |
| 6,689,470 | B1 | * | 2/2004 | Joseph | ................. | B23K 35/002 |
| | | | | | | 428/920 |
| 6,745,930 | B2 | * | 6/2004 | Schmitt | .............. | H01L 21/4882 |
| | | | | | | 228/122.1 |
| 7,186,948 | B1 | * | 3/2007 | Gordon | ............... | B23K 26/123 |
| | | | | | | 219/121.64 |
| 7,270,885 | B1 | * | 9/2007 | Karandikar | .......... | C04B 37/006 |
| | | | | | | 428/448 |
| 7,624,906 | B2 | * | 12/2009 | Yan | ......................... | C22C 18/04 |
| | | | | | | 228/111.5 |
| 2004/0096691 | A1 | * | 5/2004 | Joseph | .................... | C22C 21/02 |
| | | | | | | 428/634 |

| | | | | | | |
|---|---|---|---|---|---|---|
| 2005/0233128 | A1 | | 10/2005 | Joseph | | |
| 2011/0268982 | A1 | * | 11/2011 | Hertel | .................. | B23K 1/0016 |
| | | | | | | 428/545 |
| 2017/0028498 | A1 | * | 2/2017 | Warnes | .................. | C25D 11/04 |
| 2017/0368641 | A1 | * | 12/2017 | Wiehl | ............... | B23K 35/0222 |
| 2020/0198297 | A1 | * | 6/2020 | Marshall | ................ | B22F 7/064 |
| 2022/0161343 | A1 | * | 5/2022 | Blain | .................. | B23K 20/023 |

FOREIGN PATENT DOCUMENTS

| | | | | | | |
|---|---|---|---|---|---|---|
| CN | 102632347 | A | * | 8/2012 | | |
| CN | 104475898 | A | * | 4/2015 | .............. | B23K 1/19 |
| CN | 105458547 | B | * | 12/2017 | ............. | B23K 35/40 |
| CN | 112958944 | A | * | 6/2021 | .......... | B23K 35/286 |
| CN | 114669816 | A | * | 6/2022 | .............. | B23K 1/00 |
| DE | 102010010754 | A1 | * | 9/2011 | ............. | B23K 15/04 |
| EP | 3398703 | A1 | * | 11/2018 | ........ | B23K 35/3006 |
| JP | 2004523363 | A | * | 8/2004 | .......... | B23K 35/001 |
| JP | 2007245219 | | | 9/2007 | | |
| JP | 4127379 | | | 7/2008 | | |
| WO | WO-9924254 | A1 | * | 5/1999 | ............. | C22C 49/06 |
| WO | WO-2005069972 | A2 | * | 8/2005 | ............. | F16D 69/04 |
| WO | WO-2010136899 | A1 | * | 12/2010 | ............. | B32B 37/10 |
| WO | WO-2024068530 | A1 | * | 4/2024 | .......... | B23K 35/001 |

OTHER PUBLICATIONS

G. A. Krivov et al: "Optimization of Design-Production Solutions for Welded Joints in 415-422. Aircraft Engines", Welding in the World, Springer, DE, vol. 33, No. 6, Nov. 1, 1994 (Nov. 1, 1994), pp. 415-422, XP000483646, ISSN: 0043-2288.
Extended European Search Report for EP App. No. 25183916.3-1103, dated Dec. 11, 2025.

* cited by examiner

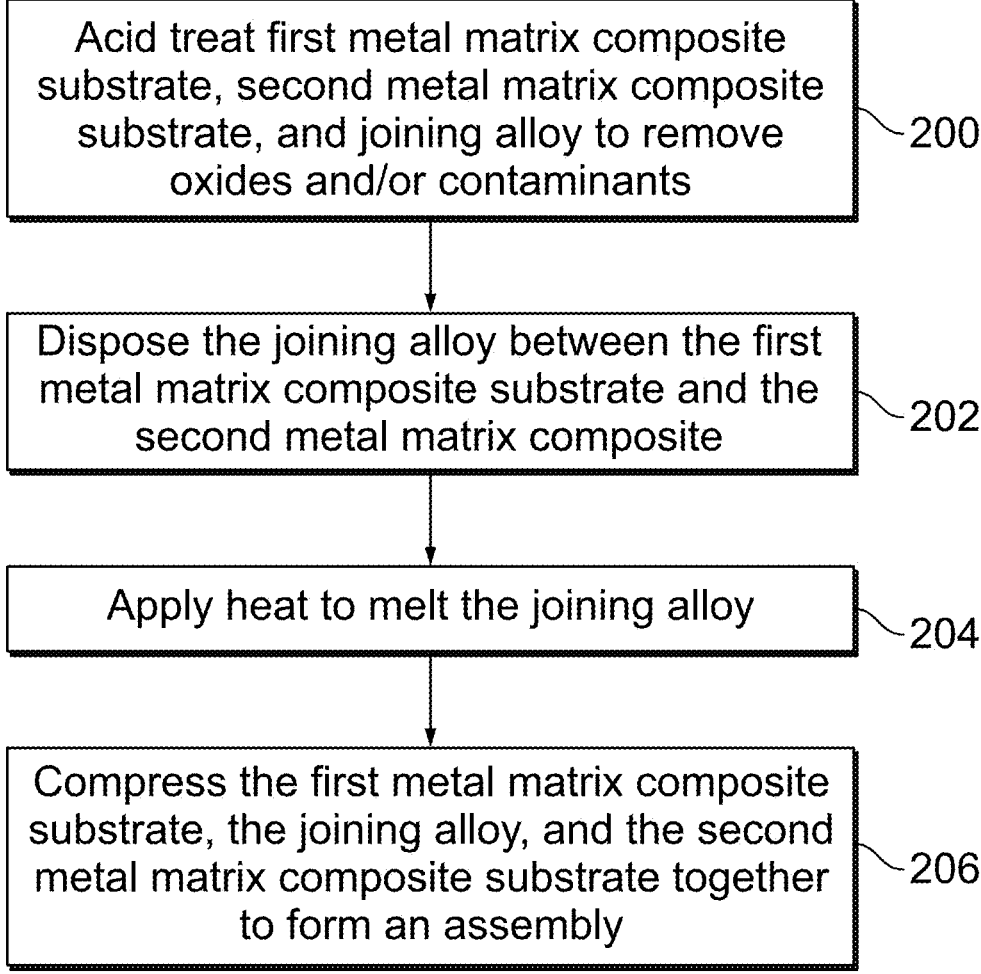

Acid treat first metal matrix composite substrate, second metal matrix composite substrate, and joining alloy to remove oxides and/or contaminants ~200

Dispose the joining alloy between the first metal matrix composite substrate and the second metal matrix composite ~202

Apply heat to melt the joining alloy ~204

Compress the first metal matrix composite substrate, the joining alloy, and the second metal matrix composite substrate together to form an assembly ~206

FIG. 2

SYSTEMS AND METHODS FOR JOINING METAL MATRIX COMPOSITE MATERIALS

FIELD OF THE DISCLOSURE

Examples of the present disclosure generally relate to systems and methods for preparing and joining metal matrix composite materials.

BACKGROUND OF THE DISCLOSURE

Metal matrix composites are semi-metallic materials (instead of just a metal), and include a matrix formed of metal (such as aluminum, copper, steel, or the like) and composite fibers (such as aluminum oxide fibers, carbon fibers, metallic fibers, polymeric fibers, and/or the like). In various assemblies, two metal matrix composites may need to be connected together.

However, known joining methods pose various drawbacks, such as an inability to retain the original geometry of the metal matrix composites. As another example, during a welding process, the metal and the matrix can separate, thereby distorting the matrix significantly, while molten metal can sag or run due to gravity. Further, known joining processes are typically unable to control a final shape of a resulting joint. Also, it has been found that temperatures across a joint area vary significantly, resulting in partial joining and a rapidly formed oxidation layer that prevents or otherwise reduces fusion of surfaces.

SUMMARY OF THE DISCLOSURE

A need exists a system and a method for efficiently and effectively joining metal matrix composite materials together.

With that need in mind, certain examples of the present disclosure provide a method including disposing a joining alloy between a first metal matrix composite substrate and a second metal matrix composite substrate to provide an assembly; and heating the assembly to a melting temperature of the joining alloy for a predetermined period of time. The melting temperature of the joining alloy is less than a melting temperature of the first metal matrix composite substrate and the second metal matrix composite substrate.

In at least one example, the method also include compressing the assembly during the heating.

Each of the first metal matrix composite substrate and the second metal matrix composite substrate includes a metal matrix and composite fibers. For example, the metal matrix can be formed of aluminum, and the composite fibers can be formed of aluminum oxide. A thickness of each of the first metal matrix composite substrate and the second metal matrix composite substrate can be 0.01 inches.

In at least one example, the joining alloy is formed of an aluminum alloy. For example, the joining alloy is formed of aluminum 4047. In at least one example, prior to the heating, the joining alloy has a uniform thickness. As an example, the uniform thickness can be 0.008 inches.

In at least one example, the method also includes disposing a first support member between the first metal matrix composite substrate and a first heating element, and disposing a second support member between the second metal matrix composite substrate and a second heating element. The first heating element and the second heating element provide the heating. The first support member and the second support member can be formed of stainless steel.

In at least one example, the predetermined period of time is less than 15 seconds.

In at least one example, the method also includes prior to the disposing, treating the first metal matrix composite substrate, the second metal matrix composite substrate, and the joining alloy. The treating can be or otherwise include acid treating.

In at least one example, the heating is controlled by a control unit.

BRIEF DESCRIPTION OF THE DRAWINGS

FIG. 2 illustrates a flow chart of a method, according to an example of the present disclosure.

DETAILED DESCRIPTION OF THE DISCLOSURE

The foregoing summary, as well as the following detailed description of certain examples will be better understood when read in conjunction with the appended drawings. As used herein, an element or step recited in the singular and preceded by the word "a" or "an" should be understood as not necessarily excluding the plural of the elements or steps. Further, references to "one example" are not intended to be interpreted as excluding the existence of additional examples that also incorporate the recited features. Moreover, unless explicitly stated to the contrary, examples "comprising" or "having" an element or a plurality of elements having a particular condition can include additional elements not having that condition.

Figure 1:
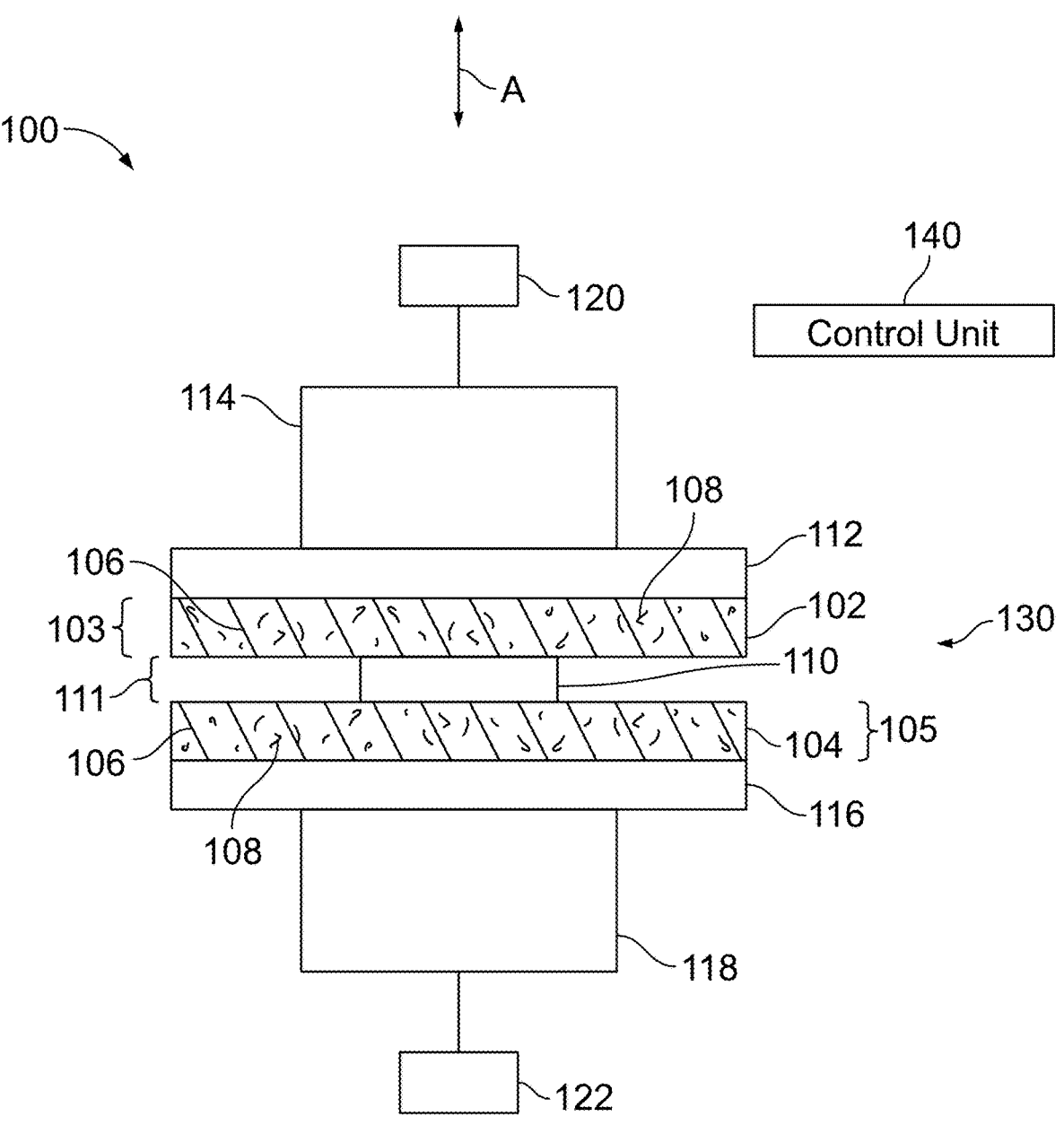
FIG. 1 illustrates a simplified schematic diagram of a system for joining a first metal matrix composite substrate to a second metal matrix composite substrate, according to an example of the present disclosure.

FIG. 1 illustrates a simplified schematic diagram of a system 100 for joining a first metal matrix composite substrate 102 to a second metal matrix composite substrate 104, according to an example of the present disclosure. The metal matrix composite substrates 102 and 104 can be various structures, such as a panel, a strap, a beam, or the like. In at least one example, the metal matrix composite substrates 102 and 104 are configured to form a portion of an aircraft, such as a wing, fuselage, or the like. The metal matrix composite substrates 102 and 104 are a semi-metallic material (instead of just a metal), and include a matrix formed of metal (such as aluminum, copper, steel, or the like) and composite fibers (such as aluminum oxide fibers, carbon fibers, ceramic fibers, metallic fibers, polymeric fibers, and/or the like). The metal matrix composite substrates 102 and 104 include a metal matrix 106 and composite fibers 108. In at least one example, the first metal matrix composite substrate 102 and the second metal matrix composite substrate 104 are formed of 40-50% aluminum, and 50-60% aluminum oxide. For example, the metal matrix 106 is formed of aluminum, and the composite fibers 108 are formed of aluminum oxide. Optionally, the metal matrix 106 can be formed of other metals, such as copper or steel, and the composite fibers 108 can be formed of other materials, such as carbon fibers.

The first metal matrix composite substrate 102 has a first thickness 103, and the second metal matrix composite substrate 104 has a second thickness 105. The first thickness 103 and the second thickness 105 can be the same. Optionally, the first thickness 103 can differ from the second thickness 105. As an example, each of the first thickness 103 and the second thickness 105 is 0.01 inches. Optionally, the thicknesses 103 and 105 can be less than 0.01 inches, such as 0.001 inches, or greater than 0.01 inches, such as 0.02 inches.

A joining alloy 110 is disposed between the first metal matrix composite substrate 102 and the second metal matrix composite substrate 104. The joining alloy 110 is configured to secure the first metal matrix composite substrate 102 to the second metal matrix composite substrate 104, such as to form a joint therebetween. The joining alloy 110 is selected to have a melting temperature slightly below the melting point of the first metal matrix composite substrate 102 and the second metal matrix composite substrate 104. As an example, the joining alloy 110 can be formed of an aluminum alloy. As a further example, the joining alloy 110 is formed of aluminum 4047, which has a melting point in the range of 577-582° Celsius. Optionally, the joining alloy 110 can be formed of various other metallic alloys.

In at least one example, prior to a melting/soldering process, the joining alloy 110 has a uniform thickness throughout. The uniform thickness 111 reduces the amount of oxide pulled into a soldering volume, thereby leading to an efficient and effective soldering process.

The joining alloy 110 has a thickness 111, which can be less (or optionally greater) than the first thickness 103 and the second thickness 105. For example, the thickness 111 is 0.008 inches. Optionally, the thickness 111 can be less than 0.008 inches (such as 0.007 inches), or greater than 0.008 inches (such as 0.00825 inches). It is to be understood that the thicknesses shown in FIG. 1 are not drawn to scale.

A first support member 112 is disposed between the first metal matrix composite substrate 102, and a first heating element 114. Similarly, a second support member 116 is disposed between the second metal matrix composite substrate 104, and a second heating element 118. In at least one example, the first support member 112 and the second support member 116 are metallic members. As a further example, the first support member 112 and the second support member 116 are stainless steel strips, such as pieces of stainless steel foil.

In at least one example, the first heating element 114 and the second heating element 118 are cartridge heaters. For example, each of the first heating element 114 and the second heating element 118 can be 1 inch square copper block cartridge heaters. Optionally, the first heating element 114 and the second heating element 118 can be different types of heaters formed of different materials. As another example, instead of separate and distinct heating elements, the system 100 can use an oven to provide heat. As another example, electric coil heaters can be used.

In at least one example, a first actuator 120 (such as a vise, motor, and/or the like) is coupled to the first heating element 114, while a second actuator 122 (such as a vise, motor, and/or the like) is coupled to the second heating element 118. The first actuator 120 is configured to move the first heating element 114, such as in the directions of arrows A, while the second actuator 122 is configured to move the second heating element 118, such as in the directions of arrows A. In at least one example, the first actuator 120 and the second actuator 122 are part of a vise. Optionally, the system 100 may not include the first actuator 120 and/or the second actuator 122.

In order to join the first metal matrix composite substrate 102 to the second metal matrix composite substrate 104, the first heating element 114 and the second heating element 118 are operated to apply heat for a predetermined period of time to melt the joining alloy 110. In particular, the first heating element 114 and the second heating element 118 generate heat to a melting temperature of the joining alloy 110, such as between 577-582° Celsius. As the joining alloy 110 melts, the joining alloy 110 fuses to the metal matrix 106 of each of the first metal matrix composite substrate 102 and the second metal matrix composite substrate 104. Because the joining alloy 110 melts at a temperature below the melting point of each of the first metal matrix composite substrate 102 and the second metal matrix composite substrate 104, the joining alloy diffuses and fuses with (but does not displace) the first metal matrix composite substrate 102 and the second metal matrix composite substrate 104. The first heating element 114 and the second heating element 118 are operated to generate the heat to melt the joining alloy 110 for a predetermined period of time, such as 10 seconds or less, to provide a secure and stable assembly 130, which includes the first metal matrix composite substrate 102 joined to the second metal matrix composite substrate 104 by the joining alloy 110.

In at least one example, in order to control the cooling of the assembly 130, the actuators 120 and 122 can be operated to move the first heating element 114 and the second heating element 118 away from the assembly 130 at a predetermined rate. Optionally, the system 100 may not include the actuators, and the method may not include moving the heating elements away from the assembly 130.

As described herein, the system 100 is configured to join the first metal matrix composite substrate 102 to the second metal matrix composite 104, which can each be strips of aluminum/aluminum ceramic metal matrix composite, to form a lap joint. The first metal matrix composite substrate 102 and the second metal matrix composite 104 are held in place, such as by the first support member 112 and the second support member 116, throughout the joining process (such as welding or soldering together by the application of heat to the joining alloy 110).

In at least one example, before the joining process, the first metal matrix composite substrate 102, the second metal matrix composite substrate 104, and the joining alloy 110 (and optionally, the first support member 112 and the second support member 116) are treated to remove oxides or other contaminants. In a further example, the components (such as aluminum components) can be acid treated to remove oxides or other contaminants. For example, the components can be cleaned with a liquid mildly thixotropic acid, such as Ardrox® 1250B. It has been found that cleaning the components with Ardrox® 1250B allows for an improved soldering process in relation to the first metal matrix composite substrate 102 and the second metal matrix composite substrate 104.

The first support member 112 and the second support member 116 provide a geometry specific fixture that secures the pieces into position and prevents movement of the joint other than a small amount of movement towards each other. The first support member 112 and the second support member 116 provide a compliant fixture that secures the assembly 130 under a controlled and adjustable pressure. In at least one example, the first support member 112 and the second support member 116 are heated by the first heating element 114 and the second heating element 118, respectively, to a temperature associated with the melting point of the joining alloy 110. The actuators 120 and 122 are operated to provide compression, thereby allowing fusion of the joining alloy 110 with the first metal matrix composite substrate 102 and the second metal matrix composite substrate 104.

The pressure exerted during compression allows for a desired amount of contact between the joining alloy 110 and the first metal matric composite substrate 102 and the second metal matrix composite substrate 104. During heating, the joining alloy 110 can melt and tend to squeeze out of the joint, which can reduce an overall thickness of the joining alloy 110. An initial amount of exerted pressure is exerted so that there a non-zero compressive force on the joining alloy 110 at a final thickness. Such initial pressure depends on the stiffness of the entire assembly 130. The compression distance of the assembly 130 perpendicular to the joining alloy 110 under the initial pressure is greater than the reduction in thickness of the joining alloy 110. Accordingly, such compression being at least equal to the initial thickness of the joining alloy 110 results in a desirable joint. In at least one example, 10 pounds per square inch of compressive pressure can be exerted. Optionally, the compressive pressure can be less than 10 pounds per square inch (such as 5 pounds per square inch), or greater than 10 pounds per square inch (such as 12 pounds per square inch).

As noted, the melting points of the joining alloy 110 and the first and second metal matrix composite substrates 102 and 104 can be close, but distinct from one another. In particular, the melting point of the joining alloy 110 is less than the melting point of the first and second metal matrix composite substrates 102 and 104. Heat is generated by the first and second heating elements 114 and 118 to provide fusion between un-oxidized metal surfaces of the joining alloy 110 and the first and second metal matrix composite substrates 102 and 104, but not allow for flow out of the assembly 130 during compression.

In at least one example, the system 100 also includes a control unit 140, in communication with the first heating element 114 and the second heating element 118, such as through one or more wired connections. The control unit 140 is configured to operate the first heating element 114 and the second heating element 118 as described herein. For example, the control unit 140 operates the first heating element 114 and the second heating element 118 to ensure even heating. The control unit 140 can also be in communication with the first actuator 120 and the second actuator 122, such as through one or more wired or wireless connections. The control unit 140 can also be configured to operate the first actuator 120 and the second actuator 122, as described herein. Optionally, the system 100 may not include the control unit 140. Instead, the heating elements (and optionally the actuators) can be manually controlled.

As used herein, the term "control unit," "central processing unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the control unit 140 may be or include one or more processors that are configured to control operation, as described herein.

The control unit 140 is configured to execute a set of instructions that are stored in one or more data storage units or elements (such as one or more memories), in order to process data. For example, the control unit 140 may include or be coupled to one or more memories. The data storage units may also store data or other information as desired or needed. The data storage units may be in the form of an information source or a physical memory element within a processing machine.

The set of instructions may include various commands that instruct the control unit 140 as a processing machine to perform specific operations such as the methods and processes of the various examples of the subject matter described herein. The set of instructions may be in the form of a software program. The software may be in various forms such as system software or application software. Further, the software may be in the form of a collection of separate programs, a program subset within a larger program, or a portion of a program. The software may also include modular programming in the form of object-oriented programming. The processing of input data by the processing machine may be in response to user commands, or in response to results of previous processing, or in response to a request made by another processing machine.

The diagrams of examples herein may illustrate one or more control or processing units, such as the control unit 140. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the control unit 140 may represent processing circuitry such as one or more of a field programmable gate array (FPGA), application specific integrated circuit (ASIC), microprocessor(s), and/or the like. The circuits in various examples may be configured to execute one or more algorithms to perform functions described herein. The one or more algorithms may include aspects of examples disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

FIG. 2 illustrates a flow chart of a method, according to an example of the present disclosure. Referring to FIGS. 1 and 2, at 200, the first metal matrix composite substrate 102, the second metal matrix composite substrate 104, and the joining alloy 110 (and optionally the first support member 112 and the second support member 116) are treated (such as acid treated) to remove oxides and/or contaminants. The components can be immersed in a liquid (such as an acid) for a period between 10-20 minutes, rinsed with water (such as once, twice, or more times), and drying in an inert environment, wiped with a cloth, and/or the like.

At 202, the joining alloy 110 is disposed between the first metal matrix composite substrate 102 and the second metal matrix composite substrate 104. For example, the joining alloy 110 is sandwiched between at least a portion of the first metal matrix composite substrate 102 and at least a portion of the second metal matrix composite substrate 104. At 204, heat is applied (such as via the first heating element 114 and the second heating element 118) to melt the joining alloy 110 to fuse to the first metal matrix composite substrate 102 and the second metal matrix composite substrate 104. As noted, the heating elements 114 and 118 are controlled, such as by the control unit 140, to generate heat to a temperature that melts the joining alloy, but not the first metal matrix composite substrate 102 or the second metal matrix composite substrate 104. The heat is applied for a predetermined period, such as less than 10 seconds. At 206, the first metal matrix composite substrate 102, the joining alloy 110, and the second metal matrix composite substrate 104 are compressed (such by the actuators 120 and 122, a vise, or the like) together to provide a secure and stable assembly 130.

As described herein, a method includes disposing the joining alloy 110 between the first metal matrix composite substrate 102 and the second metal matrix composite substrate 104 to provide the assembly 130. The method also includes heating the assembly 130 to a melting temperature of the joining alloy 110 for a predetermined period of time. The melting temperature of the joining alloy 110 is less than a melting temperature of the first metal matrix composite substrate 102 and the second metal matrix composite substrate 104. In at least one example, the method also includes compressing the assembly 130 during the heating.

Figures 3, 4:
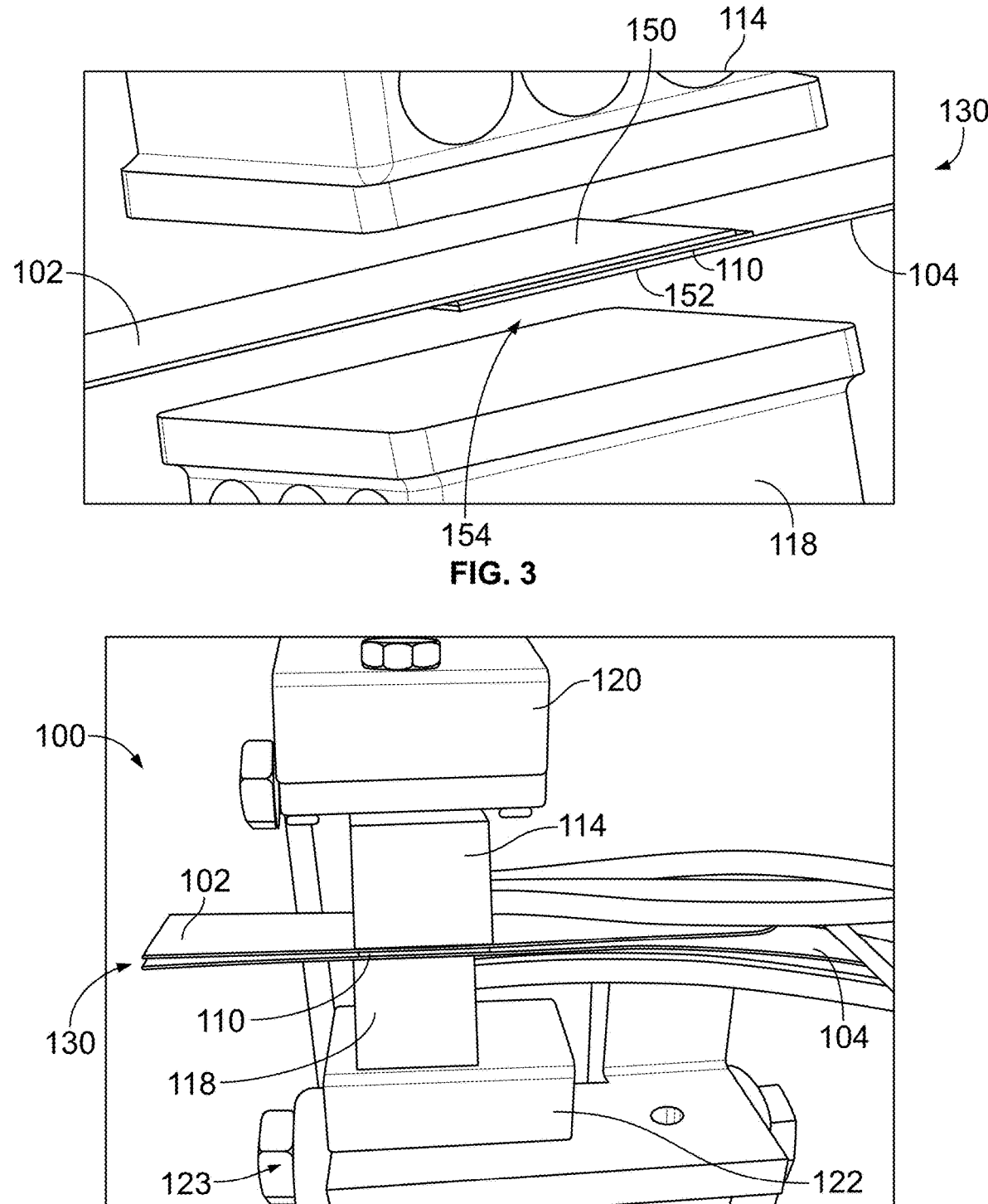
FIG. 3 illustrates an isometric side view of an assembly between a first heating element and a second heating element, according to an example of the present disclosure.
FIG. 4 illustrates a perspective side view of the system, according to an example of the present disclosure.

FIG. 3 illustrates an isometric side view of the assembly 130 between the first heating element 114 and the second heating element 118, according to an example of the present disclosure. The support members are not shown in FIG. 3. The joining alloy 110 is sandwiched between a first end 150 of the first metal matrix composite substrate 102 and a second end 152 of the second metal matrix composite substrate 104, thereby forming a lap joint 154.

FIG. 4 illustrates a perspective side view of the system 100, according to an example of the present disclosure. The first actuator 120 and the second actuator 122 can be part of a vise 123, which is configured to compress the assembly 130 together. As noted, the first heating element 114 and the second heating element 118 are configured to heat the assembly 130 to a predetermined temperature, such as between 577-582° Celsius to melt the joining alloy 110, which fuses the first metal matrix substrate 102 to the second metal matrix substrate 104. Optionally, the temperature can be less than 577° Celsius, or greater than 582° Celsius, depending on the melting point of the first metal matrix composite substrate 102 and the second metal matrix composite substrate 104. As an example, the temperature can be 600° Celsius. The first heating element 114 and the second heating element 118 are operated to apply the heat for a predetermined period of time, such as between 10-15 seconds.

Further, the disclosure comprises examples according to the following clauses:

Clause 1. A method comprising:

disposing a joining alloy between a first metal matrix composite substrate and a second metal matrix composite substrate to provide an assembly; and heating the assembly to a melting temperature of the joining alloy for a predetermined period of time, wherein the melting temperature of the joining alloy is less than a melting temperature of the first metal matrix composite substrate and the second metal matrix composite substrate.

Clause 2. The method of Clause 1, further comprising compressing the assembly during the heating.

Clause 3. The method of Clauses 1 or 2, wherein each of the first metal matrix composite substrate and the second metal matrix composite substrate comprises a metal matrix and composite fibers.

Clause 4. The method of Clause 3, wherein the metal matrix is formed of aluminum, and the composite fibers are formed of aluminum oxide.

Clause 5. The method of any of Clauses 1-4, wherein a thickness of each of the first metal matrix composite substrate and the second metal matrix composite substrate is 0.01 inches.

Clause 6. The method of any of Clauses 1-5, wherein the joining alloy is formed of an aluminum alloy.

Clause 7. The method of any of Clauses 1-6, wherein the joining alloy is formed of aluminum 4047.

Clause 8. The method of any of Clauses 1-7, wherein, prior to said heating, the joining alloy has a uniform thickness.

Clause 9. The method of Clause 8, wherein the uniform thickness is 0.008 inches.

Clause 10. The method of any of Clauses 1-9, further comprising:

disposing a first support member between the first metal matrix composite substrate and a first heating element; and disposing a second support member between the second metal matrix composite substrate and a second heating element, wherein the first heating element and the second heating element provide said heating.

Clause 11. The method of Clause 10, wherein the first support member and the second support member are formed of stainless steel.

Clause 12. The method of any of Clauses 1-11, wherein the predetermined period of time is less than 15 seconds.

Clause 13. The method of any of Clauses 1-12, further comprising, prior to said disposing, acid treating the first metal matrix composite substrate, the second metal matrix composite substrate, and the joining alloy.

Clause 14. The method of any of Clauses 1-13, wherein said heating is controlled by a control unit.

Clause 15. A method comprising:

treating a first metal matrix composite substrate, a second metal matrix composite substrate, and a joining alloy, wherein each of the first metal matrix composite substrate and the second metal matrix composite substrate comprises a metal matrix and composite fibers;

after said treating, disposing the joining alloy between the first metal matrix composite substrate and the second metal matrix composite substrate to provide an assembly;

heating the assembly to a melting temperature of the joining alloy for a predetermined period of time, wherein the melting temperature of the joining alloy is less than a melting temperature of the first metal matrix composite substrate and the second metal matrix composite substrate; and compressing the assembly during the heating.

Clause 16. The method of Clause 15, wherein the metal matrix is formed of aluminum, and the composite fibers are formed of aluminum oxide, wherein a thickness of each of the first metal matrix composite substrate and the second metal matrix composite substrate is 0.01 inches, and wherein the joining alloy is formed of aluminum 4047 having a uniform thickness.

Clause 17. The method of Clause 16, wherein the uniform thickness is 0.008 inches.

Clause 18. The method of any of Clauses 15-17, further comprising:

disposing a first support member between the first metal matrix composite substrate and a first heating element; and disposing a second support member between the second metal matrix composite substrate and a second heating element, wherein the first heating element and the second heating element provide said heating, and wherein the first support member and the second support member are formed of stainless steel.

Clause 19. The method of any of Clauses 15-18, wherein the predetermined period of time is less than 15 seconds.

Clause 20. A method comprising:

acid treating a first metal matrix composite substrate, a second metal matrix composite substrate, and a joining alloy, wherein each of the first metal matrix composite substrate and the second metal matrix composite substrate comprises a metal matrix and composite fibers, wherein the metal matrix is formed of aluminum, and the composite fibers are formed of aluminum oxide, wherein a thickness of each of the first metal matrix composite substrate and the second metal matrix composite substrate is 0.01 inches, wherein the joining alloy is formed of aluminum 4047 having a uniform thickness;

after said acid treating, disposing the joining alloy between the first metal matrix composite substrate and the second metal matrix composite substrate to provide an assembly;

disposing a first support member between the first metal matrix composite substrate and a first heating element;

disposing a second support member between the second metal matrix composite substrate and a second heating element, wherein the first support member and the second support member are formed of stainless steel;

heating, by the first heating element and the second heating element, the assembly to a melting temperature of the joining alloy for a predetermined period of time, wherein the melting temperature of the joining alloy is less than a melting temperature of the first metal matrix composite substrate and the second metal matrix composite substrate; and compressing the assembly during the heating.

As described herein, examples of the present disclosure provide systems and methods for efficiently and effectively joining metal matrix composite materials together.

While various spatial and directional terms, such as top, bottom, lower, mid, lateral, horizontal, vertical, front and the like can be used to describe examples of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described examples (and/or aspects thereof) can be used in combination with each other. In addition, many modifications can be made to adapt a particular situation or material to the teachings of the various examples of the disclosure without departing from their scope. While the dimensions and types of materials described herein are intended to define the aspects of the various examples of the disclosure, the examples are by no means limiting and are exemplary examples. Many other examples will be apparent to those of skill in the art upon reviewing the above description. The scope of the various examples of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various examples of the disclosure, including the best mode, and also to enable any person skilled in the art to practice the various examples of the disclosure, including making and using any devices or systems and performing any incorporated methods. The patentable scope of the various examples of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A method comprising:

disposing a joining alloy between a first metal matrix composite substrate and a second metal matrix composite substrate to provide an assembly, wherein each of the first metal matrix composite substrate and the second metal matrix composite substrate comprises a metal matrix and composite fibers, wherein the metal matrix comprises aluminum, and the composite fibers comprise aluminum oxide, wherein a thickness of each of the first metal matrix composite substrate and the second metal matrix composite substrate is 0.01 inches, wherein the joining alloy is formed of aluminum 4047 having a uniform thickness, wherein the joining alloy is distinct from the first metal matrix composite substrate and the second metal matrix composite substrate, and wherein the joining alloy is not initially secured to any portion of the first metal matrix composite substrate and the second metal matrix composite substrate;

heating the assembly to a melting temperature of the joining alloy for a predetermined period of time, wherein the melting temperature of the joining alloy is less than a melting temperature of one or more metals of the first metal matrix composite substrate and the second metal matrix composite substrate; and securing, by said heating, the joining alloy to the first metal matrix composite substrate and the second metal matrix composite substrate to form a joint between the first metal matrix composite substrate and the second metal matrix composite substrate, and wherein said securing comprises fusing the joining alloy to a metal matrix of each of the first metal matrix composite substrate and the second metal matrix composite substrate as the joining alloy melts.

2. The method of claim 1, further comprising compressing the assembly during the heating.

3. The method of claim 1, wherein, prior to said heating, the joining alloy has the uniform thickness.

4. The method of claim 3, wherein the uniform thickness is 0.008 inches.

5. The method of claim 1, further comprising:
disposing a first support member between the first metal matrix composite substrate and a first heating element; and
disposing a second support member between the second metal matrix composite substrate and a second heating element,
wherein the first heating element and the second heating element provide said heating.

6. The method of claim 5, wherein the first support member and the second support member are formed of stainless steel.

7. The method of claim 1, wherein the predetermined period of time is less than 15 seconds.

8. The method of claim 1, further comprising, prior to said disposing, acid treating the first metal matrix composite substrate, the second metal matrix composite substrate, and the joining alloy.

9. The method of claim 1, wherein said heating is controlled by a control unit.

10. A method comprising:
treating a first metal matrix composite substrate, a second metal matrix composite substrate, and a joining alloy, wherein each of the first metal matrix composite substrate and the second metal matrix composite substrate comprises a metal matrix and composite fibers, wherein the metal matrix comprises aluminum, and the composite fibers comprise aluminum oxide, wherein a thickness of each of the first metal matrix composite substrate and the second metal matrix composite substrate is 0.01 inches, wherein the joining alloy is formed of aluminum 4047 having a uniform thickness, wherein each of the first metal matrix composite substrate and the second metal matrix composite substrate comprises a metal matrix and composite fibers, wherein the joining alloy is distinct from the first metal matrix composite substrate and the second metal matrix composite substrate, and wherein the joining alloy is not initially secured to any portion of the first metal matrix composite substrate and the second metal matrix composite substrate;
after said treating, disposing the joining alloy between the first metal matrix composite substrate and the second metal matrix composite substrate to provide an assembly;
heating the assembly to a melting temperature of the joining alloy for a predetermined period of time, wherein the melting temperature of the joining alloy is less than a melting temperature of one or more metals of the first metal matrix composite substrate and the second metal matrix composite substrate;
compressing the assembly during the heating; and
securing, by said heating and said compressing, the joining alloy to the first metal matrix composite substrate and the second metal matrix composite substrate to form a joint between the first metal matrix composite substrate and the second metal matrix composite substrate, and wherein said securing comprises fusing the joining alloy to a metal matrix of each of the first metal matrix composite substrate and the second metal matrix composite substrate as the joining alloy melts.

11. The method of claim 10, wherein the uniform thickness is 0.008 inches.

12. The method of claim 10, further comprising:
disposing a first support member between the first metal matrix composite substrate and a first heating element; and
disposing a second support member between the second metal matrix composite substrate and a second heating element,
wherein the first heating element and the second heating element provide said heating, and wherein the first support member and the second support member are formed of stainless steel.

13. The method of claim 10, wherein the predetermined period of time is less than 15 seconds.

14. A method comprising:
acid treating a first metal matrix composite substrate, a second metal matrix composite substrate, and a joining alloy, wherein the joining alloy is distinct from the first metal matrix composite substrate and the second metal matrix composite substrate, wherein the joining alloy is not initially secured to any portion of the first metal matrix composite substrate and the second metal matrix composite substrate, wherein each of the first metal matrix composite substrate and the second metal matrix composite substrate comprises a metal matrix and composite fibers, wherein the metal matrix is formed of aluminum, and the composite fibers are formed of aluminum oxide, wherein a thickness of each of the first metal matrix composite substrate and the second metal matrix composite substrate is 0.01 inches, wherein the joining alloy is formed of aluminum 4047 having a uniform thickness;
after said acid treating, disposing the joining alloy between the first metal matrix composite substrate and the second metal matrix composite substrate to provide an assembly;
disposing a first support member between the first metal matrix composite substrate and a first heating element;
disposing a second support member between the second metal matrix composite substrate and a second heating element, wherein the first support member and the second support member are formed of stainless steel;
heating, by the first heating element and the second heating element, the assembly to a melting temperature of the joining alloy for a predetermined period of time, wherein the melting temperature of the joining alloy is less than a melting temperature of the first metal matrix composite substrate and the second metal matrix composite substrate;
compressing the assembly during the heating; and
securing, by said heating and said compressing, the joining alloy to the first metal matrix composite substrate and the second metal matrix composite substrate to form a joint between the first metal matrix composite substrate and the second metal matrix composite substrate, and wherein said securing comprises fusing the joining alloy to a metal matrix of each of the first metal matrix composite substrate and the second metal matrix composite substrate as the joining alloy melts.

15. The method of claim 10, wherein, prior to said heating, the joining alloy has the uniform thickness.

16. The method of claim 10, further comprising, prior to said disposing, acid treating the first metal matrix composite substrate, the second metal matrix composite substrate, and the joining alloy.

17. The method of claim 10, wherein said heating is controlled by a control unit.

18. The method of claim 14, wherein the predetermined period of time is less than 15 seconds.

19. The method of claim 14, wherein, prior to said heating, the joining alloy has the uniform thickness.

20. The method of claim 14, wherein the uniform thickness is 0.008 inches.

21. The method of claim 10, wherein said heating is controlled by a control unit.

\* \* \* \* \*